(12) United States Patent
Zietlow et al.

(10) Patent No.: US 9,629,377 B2
(45) Date of Patent: Apr. 25, 2017

(54) CONTINUOUS CHEESE PRODUCTION PROCESS

(75) Inventors: Philip K. Zietlow, Wayzata, MN (US); Troy D. Bierbaum, Brooklyn Park, MN (US)

(73) Assignee: General Mills, Inc., Minneapolis, MN (US)

( * ) Notice: Subject to any disclaimer, the term of this patent is extended or adjusted under 35 U.S.C. 154(b) by 379 days.

(21) Appl. No.: 14/235,103

(22) PCT Filed: Jul. 20, 2012

(86) PCT No.: PCT/US2012/047508
§ 371 (c)(1),
(2), (4) Date: May 12, 2014

(87) PCT Pub. No.: WO2013/016154
PCT Pub. Date: Jan. 31, 2013

(65) Prior Publication Data
US 2014/0242248 A1    Aug. 28, 2014

Related U.S. Application Data

(60) Provisional application No. 61/511,705, filed on Jul. 26, 2011.

(51) Int. Cl.
| | | |
|---|---|---|
| A23C 19/00 | (2006.01) |
| A23C 19/08 | (2006.01) |
| A23C 20/00 | (2006.01) |
| A23C 19/082 | (2006.01) |
| A23C 19/09 | (2006.01) |
| A23C 19/093 | (2006.01) |

(52) U.S. Cl.
CPC .......... A23C 19/08 (2013.01); A23C 19/082 (2013.01); A23C 19/093 (2013.01); A23C 19/0917 (2013.01); A23C 20/00 (2013.01)

(58) Field of Classification Search
CPC ... A23C 19/08; A23C 19/082; A23C 19/0917; A23C 19/093; A23C 20/00

USPC .......... 426/512, 516, 520, 580, 582
See application file for complete search history.

(56) References Cited

U.S. PATENT DOCUMENTS

| | | |
|---|---|---|
| 4,110,484 A | 8/1978 | Rule et al. |
| 4,197,322 A | 4/1980 | Middleton |
| 5,601,855 A | 2/1997 | Fager et al. |
| 6,199,346 B1 | 3/2001 | Ahad et al. |
| 6,393,976 B1 | 5/2002 | Abler |
| 7,713,564 B2 | 5/2010 | Merrill et al. |
| 7,807,207 B2 | 10/2010 | Huang et al. |
| 7,815,957 B2 | 10/2010 | Smith et al. |
| 2005/0106303 A1 | 5/2005 | Huang et al. |
| 2006/0062885 A1 | 3/2006 | Jacobson et al. |
| 2006/0159825 A1 | 7/2006 | Smith et al. |

OTHER PUBLICATIONS

Controlling processed cheese functionality, Innovations in Dairy: Dairy Industry Technology Review, May 2004, Dairy Management, Inc., Rosemont, IL.
D.R. Henning et al., "Major Advances in Concentrated and Dry Milk Products, Cheese, and Milk Fa-Based Spreads," J. Dairy Science, 89(4): 1179-1188, Apr. 2006.

*Primary Examiner* — Leslie Wong
(74) *Attorney, Agent, or Firm* — Annette M. Frawley, Esq.; Diederiks & Whitelaw, PLC

(57) ABSTRACT

Processes and equipment for continuously making a substitute or imitation cheese by feeding a heated first liquid stream including emulsifying salt, water and cheese powder into a cooker which is a twin screw mixer, feeding a heated second liquid stream including oil and casein or a non-dairy protein into the cooker, processing the first liquid stream and the second liquid stream through the cooker to form a cheese composition, and cooling the cheese composition. The cheese composition may be continuously extruded in a desired shape such as sheets or ropes and/or may be continuously cooled and cut into pieces having a reduced size such as a size to approximate shredded cheese.

19 Claims, 2 Drawing Sheets

CONTINUOUS CHEESE PRODUCTION PROCESS

This application is a U.S. National Stage of International Application Serial No.: PCT/US2012/047508, filed Jul. 20, 2012, and claims the benefit of U.S. Application Ser. No. 61/511,705 filed Jul. 26, 2011, the entire disclosure of which is incorporated herein by reference.

FIELD OF THE INVENTION

The invention relates generally to cheese and methods of making cheese, and more specifically to continuous processes of making cheese.

BACKGROUND OF THE INVENTION

Cheese can be made by various processes such as cultured or non-cultured processes. Some cheese can be made from cheese compositions. Generally, cheese compositions can be prepared from cultured, non-cultured, natural, non-natural, imitation or substitute cheeses or cheese formulations. Examples of cheese compositions and processing methods can be found in the U.S. patent publication numbers US2006/0159825 and US2005/0106303.

Typically the processes for the preparation of cheese include the preparation of the various ingredients, which will vary depending upon the type of cheese being prepared, followed by the combination of those ingredients in a cheese cooker. Within the cheese cooker, the ingredients are combined and the composition is heated, typically to a temperature of about 175° F. (about 79° C.) in order for gelatinization to occur and to destroy microbes. In commercially processes, the cheese cooker is typically a counter rotating mixer, through which the mixture may cycle multiple times along the length of the cooker and back in order for adequate mixing to occur, such that the process may take about 4 to 6 minutes to mix and heat the mixture to form a hot melted cheese.

The hot melted cheese is then pumped into a block form and transported to a freezer. The cheese block is then chilled to a temperature of about 40° F. (about 4.4° C.) in order to solidify the cheese as required for cutting the cheese into shreds or cubes, for example. In commercial settings, this cooling process typically takes about 24 hours.

SUMMARY

Embodiments of the invention include systems and processes for continuously producing cheese, including substitute and imitation cheese. One embodiment includes feeding a first liquid stream comprised of emulsifying salt, water and cheese powder into a cooker comprising a twin screw mixer, feeding a second liquid stream comprised of oil and casein or a non-dairy protein into the cooker, processing the first liquid stream and the second liquid stream through the cooker to form a cheese composition, and cooling the cheese composition. In some embodiments, the process also includes injecting steam into the cooker. The cheese composition may be pumped through a forming device. In some embodiments, the cooled cheese composition is cut into pieces having a reduced size.

In some embodiments, the forming device has a plurality of apertures, and the cheese composition is extruded through the plurality of apertures, such as in the form of a plurality of ropes. In some embodiments, such ropes may be cut into pieces. In other embodiments, the forming device having includes one or more horizontally oriented elongated apertures, and the cheese composition is extruded through the apertures in the form or one or more sheets of cheese. In other embodiments, the cheese composition is passed through a rotating forming device, which may form tear drop shaped pieces.

In some embodiments, cooling is performed by a cooling wheel or by a freezer belt. In some embodiments, cooling is performed by a freezer belt and in other embodiments cooling is performed by conveying the extruded cheese composition through a freezer. The step of cooling the extruded cheese may include reducing the temperature of the extruded cheese to a temperature of about 40° F. (about 4° C.) or less, and this cooling may occur quickly, such as by between about 15 seconds and about 5 minutes. In some embodiments, cheese pieces may be cooled by adding them to a cooled sauce such as a pizza sauce.

DETAILED DESCRIPTION

Figure 1:
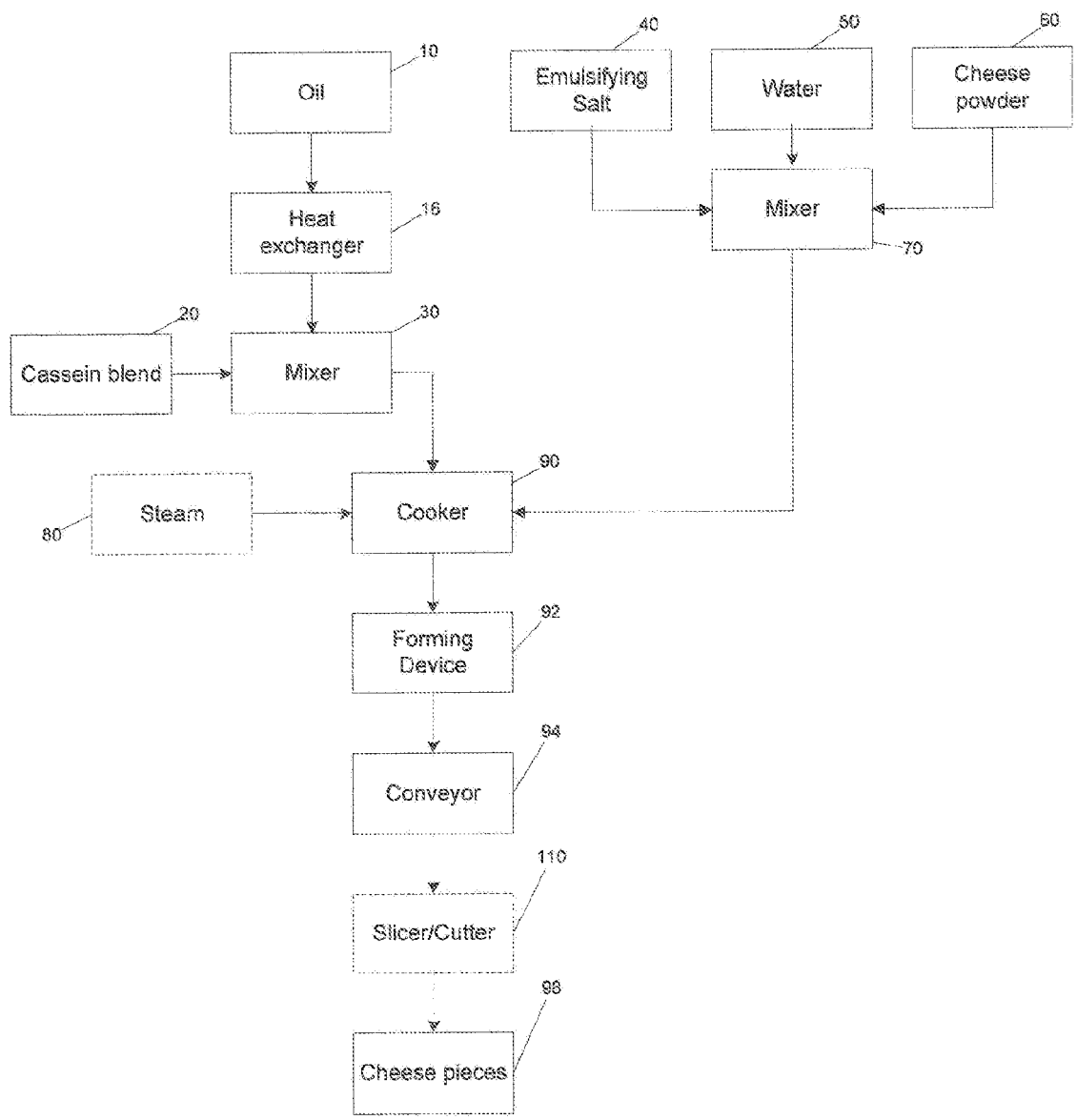
FIG. 1 is a flowchart of a continuous cheese production process according to various embodiments.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the invention provide methods for quickly and continuously producing cheese. By combining the cheese ingredients in a twin screw mixer that is used as the cheese cooker, the cheese composition can be continuously mixed and conveyed through the cooker. In addition, the continuously mixed cheese can be continuously pumped onto a conveyor such as a freezer belt. Furthermore, the cheese composition can be pumped through a forming device to form desired shapes such as ropes, sheets, or droplets. Because of its reduced size (as compared to cheese blocks), the cheese processed through a forming device can be more quickly cooled and, in some cases, cut into pieces such as bits or shreds. The method therefore allows cheese processed through a forming device to be continuously produced, with the final cheese composition cooling quickly and being of a desired shape.

In general, cheese may be classified as natural cheese (also sometimes referred to as real or traditional cheese), pasteurized processed cheese, substitute cheese, or imitation cheese. The classification of cheese may vary within the cheese industry. For example, cheese may also be classified as cultured, non-cultured, imitation, or substitute cheese. Regardless of the particular classification system, cheese of the invention may be made of natural, non-natural, cultured, non-cultured, analog, imitation or substitute cheese compositions and combinations thereof.

As used herein, the terms "cheese composition" or "cheese mixture" may be used interchangeably and refer to a composition used to make cheese products. For example, "cheese composition" could refer to a composition during one or more stages of cheese manufacturing, such as when cheese composition ingredients are being mixed together. As another example, "cheese composition" could refer to a mixture of cheese ingredients that have been mixed and/or heated as well as to molten natural cheese and combinations thereof. "Cheese product" refers to a composition that is in the form of a final cheese product, ready to be sold for human consumption. For example, a cheese product could be in the form of sliced cheese, shredded cheese, diced cheese, other shapes, or combinations of these, and the like.

Natural or cultured cheese composition can be characterized as being made directly from milk. Moreover, the United States Department of Agriculture (USDA) has specific standards for natural cheese products including ingredients used, manufacturing procedures used, and final nutritional value. Natural cheese is well known and is commercially available.

Non-natural or non-cultured cheese can include substitute cheese, process cheese substitutes, and imitation cheese.

In general, "substitute cheese" means a product that is a substitute for, and resembles another cheese, yet is not nutritionally inferior. 21 C.F.R. §§101.3 and 102.5, the respective entireties of which references are incorporated herein by reference, defines substitute and imitation food products. A substitute mozzarella cheese is further defined by 21 C.F.R. §§133.3, 133.5, and 133.155, the respective entireties of which references are incorporated herein by reference.

As used herein, an "imitation cheese" means a cheese that resembles another cheese but is nutritionally inferior.

Cheeses of the invention may be formed from a variety of cheese compositions, including "natural cheese" compositions, "pasteurized cheese" compositions, "substitute cheese" compositions and "imitation cheese" compositions. Any cheese or cheese composition that is mixed in a cheese cooker and that can be processed through a forming device after mixing is suitable for use in embodiments of the invention. In general, cheeses which may be produced according to embodiments of the invention include, but are not limited to, mozzarella cheese, cheddar cheese, American cheese, imitation cheese and the like, which are provided in the form of pieces such as bits, shreds or slices. In some embodiments, the cheese product is a string cheese which is peelable into strings or strips. The cheese pieces of the invention can be combined with other ingredients to produce other food products that include cheese including pizza, pizza products, pizza-type snack food, and the like.

Suitable cheese compositions may be one of a variety of cheese compositions as previously noted. Examples of cheese compositions that may be utilized include, but are not limited to, compositions such as those disclosed in co-owned U.S. patent publication numbers US2006/0159825 and US2005/0106303 and in U.S. Pat. Nos. 7,807,207 and 7,815,957, the disclosures of which are hereby incorporated by reference. Other examples of suitable cheese compositions are described in U.S. patent publication number US2006/0062885.

In some embodiments, the cheese compositions can include protein, fat, non-pregelatinized, modified starch, emulsifying salt, and water, and may further include various other additives. Fat is commonly known as fat, shortening, or oil. Fat can be either liquid or solid at room temperature, or a combination of liquid and solid at room temperature. Proteins that can be used in cheese compositions include dairy proteins like casein protein. Casein protein includes casein in all its forms, including rennet casein, acid casein, caseinate derivatives, fresh cheese, and dehydrated cheese.

Non-casein proteins, including dairy protein, non-dairy protein, or combinations thereof, may be used in cheese compositions. Non-casein proteins include dairy proteins naturally found in milk (e.g., whey protein concentrate or isolate), gluten protein (e.g., vital wheat gluten protein), soy protein, wheat protein, and wheat protein isolate to name a few. In some embodiments, casein protein can be first combined with starches, gluten, salts and other optional ingredients such as vitamins and colors to form a casein blend prior to combining it with other components of the other cheese composition.

In addition to fat, water, protein and starch, the cheese compositions additionally can include emulsifying salts, also called E-salts or chelating salts, which allow the casein protein to become hydrated. The cheese composition may also include various additives or one or more other optional ingredients as known to those skilled in the art. Such optional ingredients include acidifying agents, cream, milkfat, milk, salt, artificial coloring, spices or flavorings, mold-inhibitor, nutritional supplements, vitamins, gums, organic emulsifiers, minerals, and other types of cheese than the given cheese composition.

The ingredients of the cheese can be prepared as separate streams, or some ingredients can be combined and prepared as separate streams, depending upon the type of cheese being formed. It has been surprisingly discovered that processes of the invention may be used with two liquid streams that are less viscous than a flowable melted natural cheese. For example, a substitute cheese may be prepared by combining casein or a casein blend (which may include casein and starch, for example) or non-dairy protein with oil in a first liquid stream. A second liquid stream can be prepared by combining water, E-salt, and cheese powder. These two streams can then be added separately to a cheese cooker. When imitation cheese is prepared, similar streams may be used but with different quantities of ingredients, such as less or no cheese powder. Any type of cheese may be used in embodiments of the invention, with the ingredients selected in accordance with the type of cheese being made and provided in streams including at least two liquid stream which are ultimately combined in the cheese cooker. In general, the cheese cooker system is first allowed to warm up. Next, ingredients are added to the cooker and the ingredients are heated. Ingredients can be added in one group, or at different times. The ingredients are then mixed, while the temperature is maintained at an elevated state to form a molten cheese mixture or molten cheese composition. The processes according to some embodiments of the invention can be advantageous in that they are continuous and do not require high pressure or high shear.

Various types of equipment may be used for the cheese cooker according to embodiments of the invention. In one embodiment, the cheese cooker is a continuous cooker, such as a co-rotating twin screw mixer with self wiping screws and steam injection. In such embodiments, adequate heating and mixing can occur with a single pass through the mixer, making it a much more efficient system. In some embodiments, such as embodiments using a co-rotating twin screw cooker, the cooking time required for mixing and heating the cheese composition may be about 1-2 minutes. In other embodiments, the cheese cooker may be a counter-rotating twin screw mixer, such as LEISTRITZ ZSE110. In still other embodiments, the cheese cooker may be a scraped surface heat exchanger, such as the WAUKESHA CHERRY-BURRELL VOTATOR.

The methods of the invention may employ equipment which can allow the cheese production process to be continuous. Typical processes currently used require batch processing, due in part to the need for multiple cycles through the cheese cooker for adequate mixing to occur. In contrast, by using a twin screw mixer as a cheese cooker, the cheese composition is adequately mixed and cooked during a single cycle through the mixer. This allows the cheese cooker to continuously receive the cheese ingredients at the input end and cycle the cheese composition through and out the output end, thereby avoiding the production delays of typical batch processes. When this continuous process is combined with the direct and continuous passing of the molten cheese through a forming device and onto a conveyor belt, and particularly onto a cooling belt or drum cooler, the process is made even more efficient, as further time delays are avoided.

When cooking of the cheese composition is complete, the cheese composition can be cooled and formed and optionally cut to form a final cheese product, and the order of the steps may vary. In some embodiments, the cheese composition is first cooled, then formed into a shape, then cut. In other embodiments, the cheese composition is first formed and then cooled. In still other embodiments, the cheese composition is first formed, and then cooled and then cut.

Examples of embodiments in which the cheese composition is first formed and then cooled and then optionally cut are described as follows. In some such embodiments, when mixing and heating of the cheese composition in the cheese cooker is complete, the cheese composition is pumped directly from the cheese cooker through a forming device. This forming device may extrude the melted cheese composition in a rope form. In some embodiments, the forming device may include a single row of apertures, such that the melted cheese may be formed into a single row of ropes. The ropes may be fed directly onto a moving belt, or wheel such as a cooling wheel, such that the ropes lay side by side in a parallel orientation on the belt or wheel and are conveyed along on the belt or wheel in this orientation as the cheese is continuously pumped. In other embodiments, the ropes may be formed in any desired size and the forming device may be selected having apertures sized to produce ropes of the desired diameter. In some embodiments, the ropes may have a diameter from about 1/16 inch to about 1 inch, such as from about 1/4 inch to about 1/8 inch for making cheese shreds, for example. The forming device for making ropes may include one or more inlets, such as inlet ports, through which the molten cheese passes to enter a horizontal tube portion. The cheese may spread horizontally within the horizontal tube and pass out of the forming device through outlet tubes and/or outlet ports onto a belt. In order for continuous and even flow, the outlet tubes and/or outlet parts may vary in size, being narrower nearest the inlet port and widest furthest from the inlet port, at the ends of the forming device.

In the foregoing detailed description, the invention has been described with reference to specific embodiments. However, it may be appreciated that various modifications and changes can be made without departing from the scope of the invention as set forth.

In other embodiments, the forming device may include one or more elongated apertures (such as long rectangular or oval apertures) such that the cheese is formed into a single flat sheet or as a plurality of flat sheets. As with the ropes, the sheets may be formed continuously, passing directly onto a moving belt, with the sheet laying flat upon the belt. If multiple sheets are extruded, they may be formed so as to lay side by side on the belt, in parallel orientation. The thickness and width of the sheets will be determined by the size of the aperture or apertures of the forming device. For example, the sheet may have a thickness from about 1/16 inch to about 1 inch, or from about 1/4 inch to about 3/8 inch, for example. The sheet may have a width from about 1 inch to about 2 meters, such as from about 24 inches to about 72 inches.

In other embodiments the forming device maybe a cooled roll or double sheeting rolls.

After heating and mixing the cheese composition in the cheese cooker and passing the molten cheese composition through the forming device, the formed cheese is cooled. In some embodiments, the formed cheese may be cooled by conduction on a chilled surface. For example, the chilled surface may be a freezer belt, a chilled belt, a chilled drum or a cooling wheel. In some embodiments, the cheese composition may be pumped from the forming device directly onto a chilled surface. For example, in some embodiments, the formed cheese may be conveyed on a chilled surface, such as a cooling wheel, which may have a temperature of about 50° F. (about 10° C.) or less, such that the cheese may be cooled to a refrigeration temperature or a freezing temperature. In such embodiments, the formed cheese would cool quickly and efficiently such as within from about 15 seconds to about 5 minutes, depending upon the temperature of the chilled surface and the thickness of the cheese. It should be understood that, though less desirable, the temperature of the chilled surface in some embodiments may be a temperature above but not significantly above 50° F. (10° C.); however, cooling may not be a quick and efficient. In other embodiments, the formed cheese may be cooled by convection, such as by passing the formed cheese on a belt through a cooler such as the HOSOKAWA BEPEX cooling conveyor, or by cutting the cheese into a cool liquid such as brine or sauce, such as pizza sauce. In yet other embodiments, the formed cheese may be cooled by a combination of conduction and convection.

Once the formed cheese is adequately cooled, it may be further reduced in size such as by cutting. For example, the formed cheese may be cut once it is cooled to a temperature of about 70° F. (about 21.1° C.) or less, such as from about 35° F. (about 1.7° C.) to about 45° F. (about 7.2° C.). In some embodiments, the formed cheese is cooled to a temperature from about 37° F. (about 2.8 C) to about 40° F. (4.4° C.), or from about 38° F. (about 3.3° C.) to about 40° F. (About 4.4° C.), and then cut.

Because the cheese has been formed in pieces, such as sheets or ropes, the cooling occurs much more quickly than the typical process of cooling the cheese composition in a large block. For example, when the cheese composition is extruded as ropes onto a cooling belt or wheel, the ropes may cool to a temperature of 35-40° F. (1.7-4.4° C.) in less than 5 minutes, or in some embodiments in less than 2 minutes, such as from about 1 to about 2 minutes. In contrast, the typical process of cooling the cheese block may require about 24 hours to cool the cheese to a temperature of 40° F. (4.4° C.). It can therefore be appreciated that embodiments of the invention produce a cheese product much more quickly than previously methods.

The cooled formed cheese can then be cut into smaller pieces to form the final cheese product. In some embodiments, the cheese may pass on the belt or from the cooling wheel to a belt, to a rotary cutter. In other embodiments, a guillotine cutter may be used. The cooled formed cheese, such as the cheese ropes, can be sliced into bits or shreds, for example. If the ropes have cross-sectional shapes, such as geometric shapes (stars, crescents, triangles, etc.) or other forms (animal shapes, etc.), such that they can be cut or sliced into pieces of a desired thickness, such as from about ⅛ inch to about ½ inch, having that shape or outline. Cheese that is extruded in one or more sheets can be sliced to reduce the size of the sheet, for example, the sheet of cooled extruded cheese can be cut into squares or rectangles or size appropriate for use in a sandwich, such as a slice that has approximately the same length and width as an average piece of bread, such as from about 2½ inches to about 3½ inches per side.

In some embodiments, the cheese may be extruded in a size and shape which will be that of the final product such that no further cutting is required. In such embodiments, the cheese composition is first formed and then cooled, and there is no cutting step. For example, the forming device manifold can be configured to move vertically, up and down, above a moving belt, such that the cheese can be deposited as individual pieces that may be shaped like flat-bottomed teardrops, for example, or randomly shaped deposits. Such shapes may alternatively be made by a rotating forming device. The rotating forming device may include a horizontal tube having a plurality of apertures along the length of the tube and may continuously rotate around the longitudinal axis of the horizontal tube. For each aperture, as the tube rotates and the aperture approaches the underside of the tube, molten cheese is released through the aperture, and the release of cheese stops as the tube continues rotating and the aperture approaches the upper aspect of the tube.

In still other embodiments, the cheese composition is first cooled, then formed into a shape, and then cut. For example, in some such embodiments, the cheese composition is processed through a machine which may be similar to those used for extruding and cutting pasta, such as those produced by DEMACO. In such embodiments, the cheese composition passes from the cooker through a tube within which it cools sufficiently to be formed into shapes. The end of the tube is obstructed by an end wall except for a plurality of apertures in the end wall through which the cheese composition can be extruded as a plurality of ropes. Immediately external to the end of the tube, a rotating slicer can intermittently slice the extruded rope shaped cheese into a desired length. The rope shaped sliced cheese can then fall onto a conveyor as formed sliced cheese product, which may be further cooled using any of the methods described above. Depending upon the rate of slicer rotation, the formed cheese can be any of various lengths.

The final cheese pieces can then be packaged for sale to customers. Alternatively, they can be used for production of a cheese containing product, such as pizza or pizza products. In some embodiments, the cheese pieces can be added to a cooled sauce, such as a pizza sauce, which may be at temperature of about 25-35° F. (−3.9-1.7° C.), for example. Other sauce ingredients such as meat and vegetables may also be added to the sauce, which may then be used for production of the pizza items or items containing pizza sauce. In other embodiments, the cut cheese can be added to a cooled brine for further cooling, and can be separated from the brine later prior to use of the cheese pieces.

For illustrative purposes, a more specific description of an example of a continuous cheese production process is given below and shown in the flowchart of FIG. 1 and the schematic diagram of FIG. 2. Components of the cheese are separately prepared prior to providing them as separate liquid streams into the cooker. The oil 10 is stored in a tank 12 or other storage device where it may be at a temperature of from about 100° F. (about 38° C.) to about 160° F. (about 71° C.), such as about 135° F. (about 57° C.). The oil 10 is then delivered by a pump 14 to a heat exchanger 16. The oil 10 may be heated by the heat exchanger 16 to a temperature of from about 200 F (about 93° C.) to about 250° F. (about 121° C.), such as from about 210° F. (about 99° C.) to about 230° F. (about 110° C.). The temperature should be sufficient that, after the oil 10 is mixed with the casein blend 20, the temperature of the mixture is at least 60° F. (71° C.), such as from about 160° F. (about 71° C.) to about 170° F. (about 77° C.).

Separately, a casein blend 20 is prepared which may include casein, gluten, starch, salt and flavors. The casein blend 20 may be at room temperature, for example.

The heated oil from the heat exchanger 16 and the casein blend 20 in a storage tank 22 or other storage device are separately supplied to a mixer 30, which may be any mixer capable of mixing the heated oil 10 and the casein blend 20. Examples of appropriate mixers include co-rotating mixers and inline shear blenders for continuous mixing. Alternatively, the mixer 30 may be a tank with a paddle. The mixture of heated oil 10 and casein blend 20 form a first liquid stream 35.

Separately the emulsifying salt 40, water 50 and cheese powder (dehydrated real cheese) 60 are combined in a storage container 62 to ultimately form a second liquid stream 65. Prior to mixing, the emulsifying salt 40, water 50, and/or cheese powder 60 may be at room temperature or at an elevated temperature. The emulsifying salt 40, water 50 and cheese powder 60 may be continuously provided to a mixer. The mixer may be any appropriate mixer such as a twin screw mixer or a shear mixer for continuous mixing. Alternatively, the mixer may be a batch kettle mixer. The mixture of emulsifying salt 40, water 50 and cheese powder 60 may be at a temperature of at least about 160° F. (about 71° C.), such as from about 160° F. (about 71° C.) to about 170° F. (about 77° C.), after mixing is complete.

Figure 2:
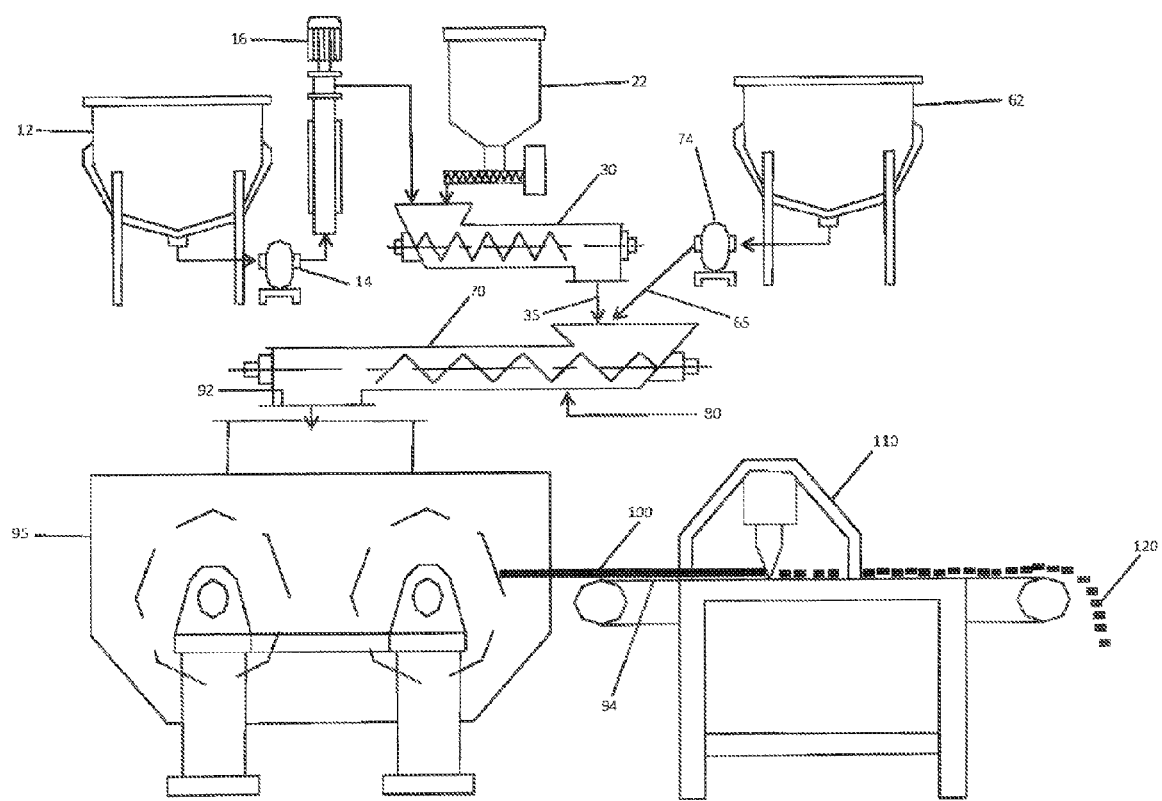
FIG. 2 is a schematic diagram of a continuous cheese production process according to various embodiments.

In the example shown in FIG. 2, the emulsifying salt 40, water 50 and cheese powder 60 mixture are pumped by pump 74 to the cooker 70, which is both a cooker and a mixer. Likewise the oil 10 and casein blend 20 mixture is pumped to the cooker 70. Within the cooker 70, the two liquid streams are combined and heated to form a hot cheese composition. In some embodiments, the cheese composition is heated to a temperature greater than about 150° F. (about 66° C.), such as from about 150° F. (about 66° C.) to about 200° F. (about 93° C.). In some embodiments, the cheese composition is heated to a temperature of from about 165° F. (about 74° C.) to about 185° F. (about 85° C.). Depending upon the temperature and water contents of the streams entering the cooker 70, the cheese composition may optionally be heated by the addition of steam 80 to the cheese composition, in which case such addition also brings the water content of the cheese composition up to the level of the final cheese product, or no additional steam 80 may be needed. In the embodiment shown in FIG. 2, the mixer and the cooker 70 are a single component, a twin screw mixer with steam 80 injection, that performs both functions.

When mixing and heating is complete, the hot cheese composition is passed from the cooker 70 directly through a forming device 92 as pieces such as ropes onto conveyor 94 such as a freezer belt. Alternatively, the pieces may pass on the conveyor into or through a freezer for cooling. In the embodiment shown in FIG. 2, the formed pieces pass from the forming device 92 onto a cooling wheel 95 and then onto a conveyor 94.

The cooled cheese pieces 100 may then optionally be cut into smaller pieces by a slicer/cutter 110, such as a rotary cutter. For example, if the cheese composition was extruded as ropes, a slicer/cutter 110 may be used to cut the ropes into bits, such as ¼ inch bits, or shreds, or other sizes, depending on the desired final use of the cheese pieces. The cooled extruded pieces 100 may pass continuously on the conveyor 94 to the cutter 110. Using this process, a final cut cheese product 120 may be prepared in about 5 minutes, whereas batch processes may require about 24 hours.

In the foregoing detailed description, various embodiments have been described. However, it may be appreciated that various modifications and changes can be made without departing from the general scope described herein.

What is claimed:

1. A continuous process for making a substitute or imitation cheese comprising:
    feeding a heated first liquid stream, which has a temperature of at least 150° F. (about 66° C.) and is comprised of emulsifying salt, water and cheese powder, into a cooker comprising a twin screw mixer;
    feeding a heated second liquid stream, which has a temperature of at least 160° F. (about 71° C.) and is comprised of oil and casein or a non-dairy protein, into the cooker;
    processing the first liquid stream and the second liquid stream through the cooker to form a cheese composition; and
    cooling the cheese composition.

2. The process of claim 1 further comprising injecting steam into the cooker.

3. The process of claim 1 further comprising processing the cheese composition through a forming device having a plurality of apertures, wherein the cheese composition is extruded through the plurality of apertures.

4. The process of claim 3 wherein the formed cheese composition comprises a plurality of ropes.

5. The process of claim 1 further comprising processing the cheese composition through a forming device having a horizontally oriented elongated aperture, wherein the cheese composition is extruded through the aperture as a sheet.

6. The process of claim 5 wherein the sheet of cheese has a thickness of between about 1/16 inch and about 1 inch.

7. The process of claim 1 wherein cooling comprises conveying the cheese composition on a chilled surface.

8. The process of claim 7 wherein the chilled surface comprises a cooling wheel.

9. The process of claim 1 wherein cooling comprises conveying the cheese composition on a chilled surface having a temperature of about 50° F. (about 10° C.) or less.

10. The process of claim 1 wherein cooling comprises conveying the cheese composition through a freezer.

11. The process of claim 1 wherein the twin screw mixer comprises a co-rotating twin screw mixer.

12. The process of claim 1 further comprising extruding the cheese composition through a rotating forming device.

13. The process of claim 12 wherein the rotating forming device deposits the cheese in tear drop shaped pieces.

14. The process of claim 1 further comprising cutting the cooled cheese composition into pieces having a reduced size.

15. The process of claim 14 wherein cutting the cooled cheese composition comprises passing the cooled cheese on a cooling conveyor to a rotary cutter or guillotine cutter.

16. The process of claim 1 wherein the cooling the extruded cheese composition comprises reducing the temperature of the extruded cheese to temperature of about 40° F. (about 4.4° C.) or less.

17. The process of claim 1 wherein the extruded cheese composition cools to a temperature of about 40° F. (about 4.4° C.) or less in between about 15 seconds and about 5 minutes.

18. The process of claim 1 wherein the first heated liquid stream has a temperature of from about 165° F. (about 74° C.) to about 185° F. (about 85° C.).

19. The process of claim 1 wherein the second heated liquid stream has a temperature of from about 160° F. (about 71° C.) to about 170° F. (about 77° C.).

* * * * *